(12) United States Patent
Lienert et al.

(10) Patent No.: US 6,337,442 B1
(45) Date of Patent: Jan. 8, 2002

(54) COATING WHICH IS RESISTANT TO PARTIAL DISCHARGES, FOR ENAMELLED WIRE

(75) Inventors: Klaus-Wilhelm Lienert; Gerold Schmidt, both of Hamburg; Helmut Lehmann, Reinbek, all of (DE)

(73) Assignee: Schenectady International, Inc., Schenectady, NY (US)

( * ) Notice: Subject to any disclaimer, the term of this patent is extended or adjusted under 35 U.S.C. 154(b) by 0 days.

(21) Appl. No.: 09/485,060

(22) PCT Filed: Jul. 31, 1998

(86) PCT No.: PCT/EP98/04783

§ 371 Date: Apr. 12, 2000

§ 102(e) Date: Apr. 12, 2000

(87) PCT Pub. No.: WO99/08288

PCT Pub. Date: Feb. 18, 1999

(30) Foreign Application Priority Data

Aug. 6, 1997 (DE) ............................... 197 34 003
Mar. 27, 1998 (DE) ............................... 198 13 667
Jul. 17, 1998 (DE) ............................... 198 32 186

(51) Int. Cl.⁷ ............................................... H01B 7/00
(52) U.S. Cl. .............................................. 174/120 R
(58) Field of Search ....................... 174/120 R, 120 SR, 174/120 AR; 428/372, 379, 383, 389

(56) References Cited

U.S. PATENT DOCUMENTS

| 3,287,311 A | 11/1966 | Edwards |
| 3,553,282 A | 1/1971 | Holub |
| 3,554,984 A | 1/1971 | George |
| 4,448,918 A | 5/1984 | Leland |
| 4,493,873 A | 1/1985 | Keane et al. |
| 4,537,804 A | 8/1985 | Keane et al. |
| 4,760,296 A | 7/1988 | Johnston et al. |
| 4,935,302 A | 6/1990 | Hjortsberg et al. |
| 5,104,735 A | * 4/1992 | Cioffi et al. ...... 174/120 AR X |
| 5,654,095 A | * 8/1997 | Yin et al. ............... 174/120 R |

FOREIGN PATENT DOCUMENTS

| CA | 1 168 857 | 6/1984 |
| DE | 1 266 427 | 4/1968 |
| DE | 19 56 512 | 5/1971 |
| DE | 24 41 020 | 3/1976 |
| DE | 25 56 523 | 6/1977 |
| EP | 0 072 223 | 2/1983 |
| EP | 0 076 579 | 4/1983 |
| EP | 0 356 929 | 3/1990 |
| EP | 0 660 336 A2 | 6/1995 |
| EP | 0 768 679 A2 | 4/1997 |
| EP | 0 768 680 A2 | 4/1997 |
| GB | 2161799 | * 1/1986 |
| JP | 59176363 | 10/1984 |
| WO | 96/42089 | 12/1996 |

OTHER PUBLICATIONS

Abstract, XP–002085025, 1992, see abstract No date.

* cited by examiner

Primary Examiner—Chau N. Nguyen
(74) Attorney, Agent, or Firm—Pillsbury Winthrop, LLP

(57) ABSTRACT

A coating for enamelled wire having a base coat and a top coat, and enamelled wire having such coating. The top coat contains a binder, titanium dioxide and pyrogenic silica.

11 Claims, No Drawings

COATING WHICH IS RESISTANT TO PARTIAL DISCHARGES, FOR ENAMELLED WIRE

BACKGROUND OF THE INVENTION

The present invention relates to a novel coating for enamelled wires comprising at least one wire coating material, containing conventional wire enamel binders and additives for improving the partial discharge resistance of the enamelled wire produced from the enamel.

Coatings for enamelled wires frequently have a two-coat or multicoat structure with at least one base coat and at least one top coat.

The wire coating materials usually used for this purpose today are in general solutions of the typical binders, such as, for example, polyesters, polyesterimides, polyurethane resins and polyamidoimides, in solvents, optionally in combination with commercial hydrocarbon diluents. After application and curing, firmly adhering enamel films of high thermal and mechanical quality are obtained. The polymers of these films themselves have only little resistance to partial discharges which occur above a specific field strength at the wire surface.

Partial discharges which arise through locally occurring high field strengths on the wire destroy the insulating wire enamel film. The incorporation of inorganic components into the polymer film leads to an extension of the life, probably by evening out the discharge. This knowledge has led to various coating systems which contain a larger or smaller amount of oxide substances as fillers being published as wire enamels.

EP 0 768 680 and EP 0 768 679 describe enamelled wires which contain, as a binder component for the wire enamel, a thioetheracrylatosilane prepared from tris-(2-hydroxyethyl) isocyanurate triacrylate, 3-mercaptopropylmethyldimethoxysilane, tetraethoxysilane and $SiO_2$ as filler. The resistance to partial discharge is described as being good. The thermal and mechanical properties are by no means likely to correspond to those of a standard enamelled wire.

EP 356929 and U.S. Pat. No. 4,935,302 describe formulations which, with different binders, contain $Cr_2O_3$ and $Fe_2O_3$ as fillers. Both pigments have a high density and the formulations tend to substantial sedimentation which leads to difficulties during coating and to a nonuniform distribution of the pigments in the baked enamel film.

U.S. Pat. No. 4,760,296, U.S. Pat. No. 4,493,873 and U.S. Pat. No. 4,537,804 describe formulations which contain $Al_2O_3$ as a pigment. The highly abrasive effect of the oxide on the coating nozzles which, in a coating machine, must be adjusted to one another with an accuracy of a few $\mu$m has an adverse effect on the roundness of the wires and on the surface quality.

As in U.S. Pat. No. 4,760,296, CA 1 168 857 describes the use of $Al_2O_3$, $SiO_2$ also being used. The statements made with regard to U.S. Pat. No. 4,760,296 are applicable.

JP 59 17 63 63 describes a wire which consists of a nickel-plated Cu core which is coated with a polyimide enamel filled with calcined alumina and mica powder. The process is complicated and the enamel is uneconomical owing to the low solids content of the polyimide.

U.S. Pat. No. 3,553,282 describes the use of silicone-modified polyamidocarboxylic acids. The polyimide-coated wires obtained are overengineered for normal intended uses and moreover extremely expensive.

WO 96/42089 describes enamelled wires which are insulated by means of a $TiO_2$-containing coating material applied in one coat. They are more stable with respect to partial discharges than are enamelled wires which are insulated with corresponding $TiO_2$-free coating materials applied as a single coat, but their performance characteristics as a whole are still unsatisfactory.

SUMMARY OF THE INVENTION

The object of the present invention is thus to provide a novel wire enamel coating for enamelled wires, containing conventional wire enamel binders, solvents, catalysts and additives, which coating avoids the disadvantages of the coatings known today and is simple and economical to prepare and to process.

The wire enamels used for the preparation of the coating according to the invention should have a long shelf life, good adhesion, in particular to copper wires, a very high hot penetration and an adequate heat shock. Moreover, the wire enamels should have a very high solids content in combination with a viscosity advantageous for processing. A considerable improvement in the resistance to partial discharge should be achieved with the coating according to the invention.

This object is achieved, surprisingly, by using a novel coating which has at least one base coat and at least one top coat, wherein at least one top coat contains titanium dioxide. Advantageously, the novel coating consists of a base coat and a $TiO_2$-containing top coat.

DETAILED DESCRIPTION OF THE INVENTION

The $TiO_2$-containing topcoat essential to the invention is produced from a $TiO_2$-containing wire enamel, wherein the binder used is a polyamidoimide, it being necessary to point out that the invention relates not only to this wire enamel binder but also to polyesters, polyesterimides, polyurethane resins, etc. Polyamidoimides are known and are described, for example, in U.S. Pat. No. 3,554,984, DE-A-24 41 020, DE-A-25 56 523, DE-A-12 66 427 and DE-A-19 56 512. The preparation of the polyamidoimides is carried out in a known manner from polycarboxylic acids or anhydrides thereof, in which two carboxyl groups are in the vicinal position and which must possess at least one further functional group, and from polyamines having at least one primary amino group capable of imide formation. Instead of the amino group, an isocyanate group may be used for the formation of the imide ring. The polyamidoimides can also be obtained by reacting polyamides, polyisocyanates which contain at least two NCO groups and cyclic dicarboxylic anhydrides which contain at least one further group capable of condensation or of addition.

Titanium dioxide is used as the oxide pigment for the wire coating according to the invention. Surprisingly, its use in the formulation according to the invention leads to no deterioration in the thermal and mechanical properties of the wire enamel or of the top coat. It is also surprising that a considerable improvement in the life under conditions of partial discharge is achieved for the wire enamel film.

The wire enamel formulations to be used according to the invention for the production of the top coat may preferably contain from 5 to 30% by weight, based on the organic binder, of titanium dioxide. From 10 to 20% by weight are particularly preferred.

The addition of small amounts of pyrogenic silica has proven advantageous for the sedimentation behaviour of the wire enamel to be used according to the invention. Preferably, up to 20% by weight, based on the titanium dioxide, of pyrogenic silica may be present in the wire enamel formulations to be used according to the invention. Up to 10% by weight of pyrogenic silica are particularly preferred.

Advantageously, the wire coating materials to be used according to the invention may contain from 0.5 to 5.0% by weight of a phenol resin or of a melamine resin. Contents of up to 4.0% are particularly advantageous. Commercial fluorinated additives have also proved useful.

The conventional and known $TiO_2$-free wire enamels which contain polyesters, polyesterimides, polyurethane resins or polyamidoimides as binders may be used for the production of the base coat(s) of the coatings according to the invention.

EXAMPLES

1.1 Preparation of a Polyamidoimide Enamel 38.5 g of trimellitic anhydride, 60.0 g of diphenylmethane diisocyanate and 73.5 g of N-methyl-pyrrolidone are mixed at a temperature of less than 30° C. Heating to 150°C. is effected at 10°C. per hour. The batch is kept at this temperature until no further carbon dioxide forms. The reaction product is diluted with a 2:1 mixture of N-methylpyrrolidone and xylene. The wire enamel obtained has a solids content of 35% in combination with a viscosity of 700 mPa·s at 23° C.

1.2 Preparation of a Wire Enamel to be used according to the Invention for the Production of the Top Coat 25.10 g of the enamel from Example 1 are converted into a paste with 4.70 g of a commercial titanium dioxide and 0.48 g of pyrogenic silica in a process customary in the coating industry. 64.4 g of enamel from Example 1 are added and the viscosity is then adjusted to the required level with a mixture of N-methylpyrrolidone and xylene.

| | |
|---|---|
| Viscosity at 23° C. | 965 mPa · s |
| Solids content (1 g, 1 h, 200° C.) | 37.8% |

1.3 Coating and Testing

Coating conditions:
Base coat—commercial polyesterimide wire enamel
Top coat—enamel from Example 1.2

| | |
|---|---|
| Oven: | MAG AW/1A |
| Temperature: | 520° C. |
| Application system: | nozzles |
| Wire diameter: | 0.71 mm |
| Take-off speed: | 34 m/min |
| Number of passes: | |
| Base coat | 8 |
| Top coat | 2 |

The coated wires were tested according to IEC 851.

| | |
|---|---|
| Increase: | 0.069–0.074 mm |
| Extreme fibre elongation: | 1*d + 30% |
| Heat shock: | 1*d at 300° C. OK |
| Hot penetration: | 370° C. |
| tg delta steep ascent: | 194° C. |

The property level corresponds to that of a commercial two-coat wire.

Testing resistance to partial discharge

The test specimens used were IEC twists. The test voltage was 4.5 kV at 50 Hz (sinusoidal). The twists were stored at 140° C. and the time to failure was determined.

Wires which were produced using a conventional top coating, for example from Example 1.1, were compared with wires which have the coating according to the invention, comprising a top coat produced with the top coat enamel from Example 1.2 as an overcoat.

The average life of the wires coated with the coating according to the invention is about a factor of 43 longer than the life of the wires which were coated with a conventional enamel.

What is claimed is:

1. A coating for enamelled wires comprising a base coat and a top coat, said top coat being obtained from a wire enamel comprising:
   (a) a binder selected from the group consisting of polyamidoimides, polyesters, polyesterimides, and polyurethane resins;
   (b) 5–30 wt %, relative to the weight of said binder, of titanium dioxide; and
   (c) up to 20 wt %, relative to the total weight of said titanium dioxide, of pyrogenic silica.

2. The coating of claim 1, wherein said coating consists of said base coat and said top coat.

3. The coating of claim 1, wherein said wire enamel comprises, relative to the total weight of said binder, 10–20 wt % of titanium dioxide.

4. The coating of claim 1, wherein said wire enamel comprises, relative to the total weight of said titanium dioxide, up to 10 wt % of pyrogenic silica.

5. The coating of claim 1, wherein said wire enamel comprises, relative to the total weight of said wire enamel, 20–50 wt % of solids.

6. The coating of claim 1, wherein said wire enamel has a viscosity of 200–2000 mPas at 23° C.

7. The coating of claim 1, wherein said wire enamel comprises, relative to the total weight of said wire enamel, 0.5–5 wt % of a phenol resin or a melamine resin.

8. The coating of claim 1, wherein said wire enamel comprises, relative to the total weight of said wire enamel, up to 4 wt % of a phenol resin or a melamine resin.

9. The coating of claim 1, wherein said binder is a polyamidoimide.

10. The coating of claim 1, wherein said base coat is free of titanium dioxide and formed from a second wire enamel comprising a binder selected from the group consisting of polyamidoimides, polyesters, polyesterimides, and polyurethane resins.

11. An enamelled wire comprising a coating according to any one of claims 1–8 and 9–10.

* * * * *